United States Patent
Sperber et al.

(10) Patent No.: US 7,162,614 B2
(45) Date of Patent: Jan. 9, 2007

(54) ELIMINATION OF POTENTIAL RENAMING STALLS DUE TO USE OF PARTIAL REGISTERS

(75) Inventors: Zeev Sperber, Zichron Yaakov (IL); Robert Valentine, Kyriat Tivon (IL); Yuval Bustan, Moshav Mismeret (IL); Rafi Marom, Haifa (IL)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 10/608,121

(22) Filed: Jun. 30, 2003

(65) Prior Publication Data

US 2004/0268092 A1 Dec. 30, 2004

(51) Int. Cl.
*G06F 9/38* (2006.01)
(52) U.S. Cl. ...................... 712/217; 712/219
(58) Field of Classification Search ............... 712/217, 712/219
See application file for complete search history.

(56) References Cited

U.S. PATENT DOCUMENTS

| | | | |
|---|---|---|---|
| 5,471,633 A * | 11/1995 | Colwell et al. | 712/23 |
| 5,951,670 A | 9/1999 | Glew et al. | |
| 6,560,083 B1 * | 5/2003 | Nguyen | 361/86 |

* cited by examiner

*Primary Examiner*—William M. Treat
(74) *Attorney, Agent, or Firm*—Pearl Cohen Zedek Latzer, LLP

(57) ABSTRACT

Two or more pointers, each of which indicates where values of a respective group of bits of a source of a particular micro-operation will be found when the particular micro-operation is executed, may not all point to the same register. Renaming of the source of the particular micro-operation may be enabled by generating one or more new micro-operations that merge the values into a single register. The one or more new micro-operations are inserted into a sequence of micro-operations that includes the particular micro-operation. Once the source of the particular micro-operation has been renamed, subsequent micro-operations in the sequence may be renamed, if appropriate, and executed, without having to wait for the values to be calculated.

15 Claims, 6 Drawing Sheets

ELIMINATION OF POTENTIAL RENAMING STALLS DUE TO USE OF PARTIAL REGISTERS

BACKGROUND OF THE INVENTION

A processor having more than one execution unit may employ out-of-order techniques in order to use the execution units in an efficient manner. A macroinstruction in a system memory, when processed by the processor, is decoded into one or more micro-operations ("u-ops"). Each u-op is to be executed by an out-of-order subsystem of the processor. The out-of-order subsystem enables more than one u-op to be executed at the same time, although the u-ops may be executed in a different order than the order in which they were received by the out-of-order subsystem. A processor having an out-of-order subsystem may include a set of architectural registers for storing execution results of u-ops in the order in which the u-ops were received by the out-of-order subsystem (storing the execution result of a u-op in an architectural register is called "retiring" the u-op). The out-of-order subsystem may include a set of temporary registers for storing execution results until such time as those results may be stored in the architectural registers.

One of the architectural registers may be a 32-bit register, where, for example, the entire 32-bit register may be referred to as EAX, the lowest 16 bits of the register may be referred to as AX, the lowest 8 bits of the register may be referred to as AL, and the second-lowest 8 bits of the register may be referred to as AH. An exemplary sequence of u-ops may be as follows:

(1) mov EAX←11223344 (hex)

(2) mov AL←CC (hex)

(3) mov AH←BB (hex)

(4) read EAX

This sequence of four u-ops refers to a single 32-bit register, and therefore the expected and correct result of the read u-op is the value 1122BBCC (hex).

Since the first, second and third u-ops are independent, they may be executed out of order. Therefore the out-of-order subsystem may use a temporary 32-bit register r1 to store the 32-bit result 11223344 of the first u-op, and may use the lowest 8 bits of a temporary 32-bit register r2 to store the 8-bit result CC of the second u-op, and may use the second-lowest 8 bits of a temporary 32-bit register r3 to store the 8-bit result BB of the third u-op.

The processor will not execute the fourth u-op until all of the first three u-ops have been retired, because until such time, there is no register in the processor that will yield the accurate value for EAX. While the processor is waiting for the first three u-ops to be retired, the dispatching of u-ops that would have been received by the out-of-order subsystem following the fourth u-op is postponed, thus reducing the performance of the processor.

It should be noted that this postponement or stall of the dispatching may occur for any sequence of u-ops including a write to a partial register followed by a read of a larger register (for example writing to AL/AH/AX and reading EAX or writing to AL/AH and reading AX). It should also be noted that the sequence of u-ops may include unrelated u-ops interspersed between the write u-op(s) to the partial register(s) and the read u-op(s) of the larger register(s).

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the description of embodiments of the invention.

It should be understood that embodiments of the invention may be used in any apparatus having a processor. For example, the apparatus may be a portable device that may be powered by a battery. A non-exhaustive list of examples of such portable devices includes laptop and notebook computers, mobile telephones, personal digital assistants (PDA), and the like. Alternatively, the apparatus may be a non-portable device, such as, for example, a desktop computer or a server computer.

Figure 1:
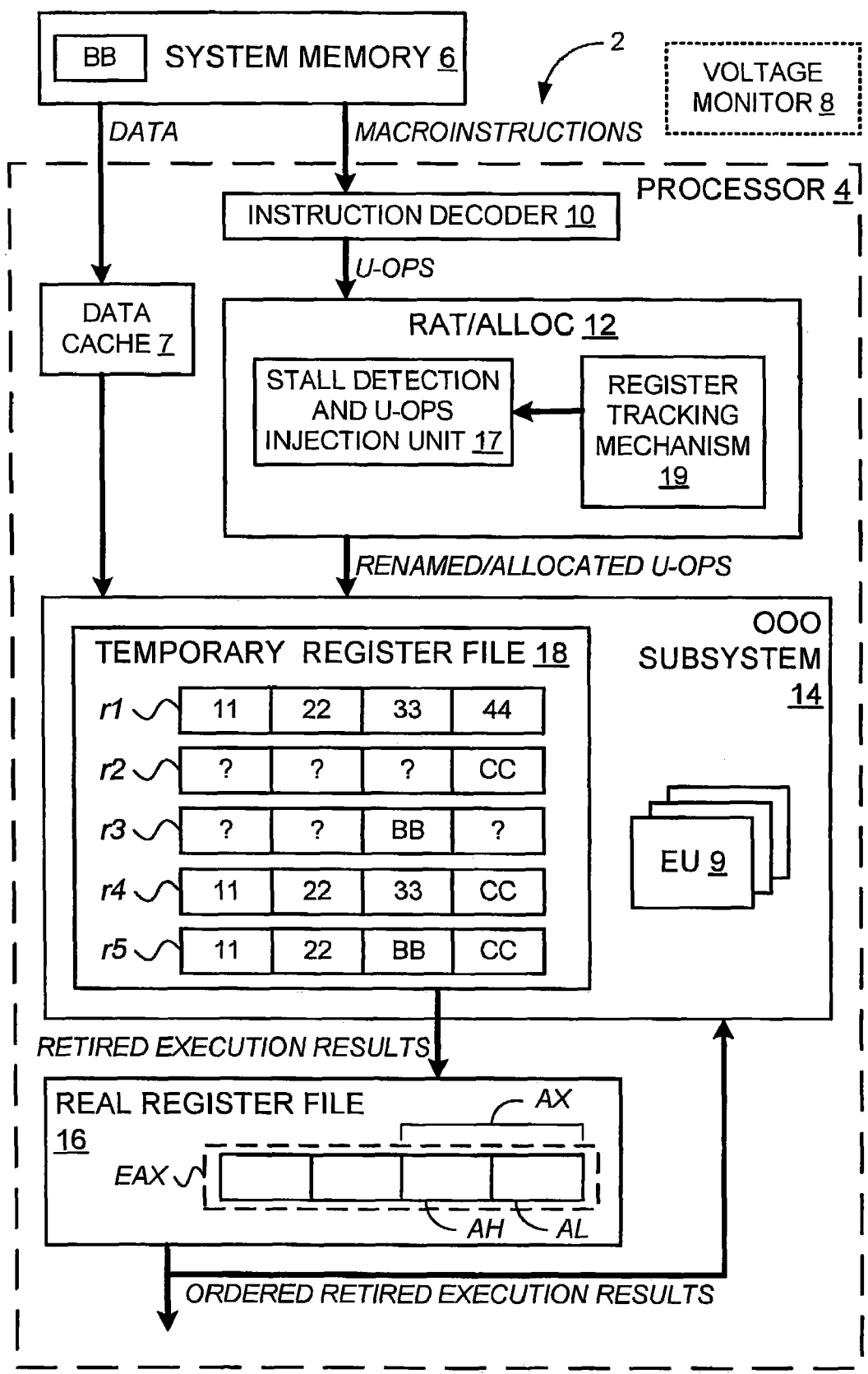
FIG. 1 is a block diagram of an apparatus having a processor.

As shown in FIG. 1, an apparatus 2 may include a processor 4 and a system memory 6, and may optionally include a voltage monitor 8.

Design considerations, such as, but not limited to, processor performance, cost and power consumption, may result in a particular processor design, and it should be understood that the design of processor 4 shown in FIG. 1 is merely an example and that embodiments of the invention are applicable to other processor designs as well. A non-exhaustive list of examples for processor 4 includes a central processing unit (CPU), a digital signal processor (DSP), a reduced instruction set computer (RISC), a complex instruction set computer (CISC) and the like. Moreover, processor 4 may be part of an application specific integrated circuit (ASIC) or may be part of an application specific standard product (ASSP).

A non-exhaustive list of examples for system memory 6 includes a dynamic random access memory (DRAM), a synchronous dynamic random access memory (SDRAM), a flash memory, a double data rate (DDR) memory, RAMBUS dynamic random access memory (RDRAM) and the like. Moreover, system memory 6 may be part of an application specific integrated circuit (ASIC) or may be part of an application specific standard product (ASSP).

System memory 6 may store macroinstructions to be executed by processor 4. System memory 6 may also store data for the macroinstructions, or the data may be stored elsewhere. Data for the macroinstructions retrieved from system memory 6 or elsewhere may be stored temporarily in a data cache 7 of processor 4.

A processor having more than one execution unit (EU) 9 may employ out-of-order techniques in order to use the execution units in an efficient manner. A macroinstruction in system memory 6, when processed by processor 4, is decoded into one or more micro-operations (u-ops) by an instruction decoder 10. Each u-op is to be executed by an out-of-order (OOO) subsystem 14 of the processor. OOO subsystem 14 enables more than one u-op to be executed at the same time, although the u-ops may be executed in a different order than the order in which they were received by OOO subsystem 14.

Processor 4 may include a real register file (RRF) 16 having a set of architectural registers for storing execution results of u-ops in the order in which the u-ops were received by OOO subsystem 14 (storing the execution result of a u-op in an architectural register is called "retiring" the u-op). Execution results of u-ops are stored temporarily in OOO subsystem 14 until such time as those results may be stored in RRF 16.

Processor 4 may include a register alias table and allocation unit (RAT/ALLOC) 12. RAT/ALLOC 12 may allocate temporary registers of TRF 18 as the destinations of u-ops received from instruction decoder 10, to store the results of the u-ops until the results are retired. RAT/ALLOC 12 may also identify where the sources of u-ops received from instruction decoder 10 are, and may rename the sources as necessary. RAT/ALLOC 12 may output to OOO subsystem 14 the allocated/renamed u-ops for execution by OOO subsystem 14.

The architectural registers of RRF 16 may include, for example, a 32-bit register, where the entire 32-bit architectural register is denoted EAX, the lowest 16 bits of the register is denoted AX, the lowest 8 bits of the register is denoted AL, and the second-lowest 8 bits of the register is denoted AH. AX, AL and AH are all "partial registers" in that they refer to only a part of the bits of register EAX. AH may be considered a "misaligned partial register" since it does not begin at the lowest bit of the register, while AL and AX may be considered "aligned partial registers".

For example, one or more macroinstructions from system memory 6 may be decoded by instruction decoder 10 into the following exemplary sequence of u-ops:

(1) mov EAX←11223344 (hex)
(2) mov AL←CC (hex)
(3) mov AH←memory location
(4) read EAX
additional u-ops The first four u-ops of this sequence refer to a single 32-bit register as the destination, and therefore the expected and correct result of u-op (4) is the value 1122BBCC (hex), if the value stored at the memory location referred to in u-op (3) is BB (hex).

RAT/ALLOC 12 may allocate 32-bit temporary registers r1, r2 and r3 to receive the execution results of u-ops (1), (2) and (3) respectively. RAT/ALLOC 12 may output to OOO subsystem 14 the following allocated u-ops (1.a), (2.a) and (3.a) instead of the original u-ops (1), (2) and (3), respectively.

(1.a) mov r1←11223344 (hex)
(2.a) mov r2[7..0]←CC (hex)
(3.a) mov r3[15..8]←memory location Since u-ops (1.a), (2.a) and (3.a) are independent of one another, OOO subsystem 14 may execute them in any order according to availability of sources and execution resources inside OOO subsystem 14, or according to some other criterion. In particular, u-ops (1.a), (2.a) and (3.a) may be executed in an order other than the order in which they were received by OOO subsystem 14.

In principle, once execution of u-ops (1.a), (2.a) and (3.a) is complete—that is, once registers r1, r2 and r3 contain their respective execution results—u-op (4) could be executed as well. However, as described in the background, until all of u-ops (1.a), (2.a) and (3.a) have been retired, there is no register in processor 4 having the correct value of EAX. Consequently, until all of u-ops (1.a), (2.a) and (3.a) have been retired, RAT/ALLOC 12 is unable to rename the source of u-op (4). RAT/ALLOC 12 cannot rename the source to architectural register EAX, because until all of u-ops (1.a), (2.a) and (3.a) have been retired, the value stored in architectural register EAX is not up to date. RAT/ALLOC 12 cannot rename the source to one of the temporary registers of TRF 18, because none of the temporary registers of TRF 18 contains all updated 32 bits. Until RAT/ALLOC 12 is able to rename the source of u-op (4), RAT/ALLOC 12 will not output u-op (4) to OOO subsystem 14 for execution.

Furthermore, since RAT/ALLOC 12 allocates temporary registers to destinations of u-ops and renames sources of u-ops in the order in which they are received from instruction decoder 10, none of the additional u-ops following u-op (4) will be allocated/renamed and output to OOO subsystem 14 until all of u-ops (1.a), (2.a) and (3.a) have been retired, even though some or all of these additional u-ops could be executed completely independently of the results of u-ops (1), (2), (3) and (4). Therefore, RAT/ALLOC 12 is stalled from the time that u-op (4) should have been renamed/allocated and output to OOO subsystem 14 until all of u-ops (1.a), (2.a) and (3.a) have been retired, and the performance of processor 4 may be reduced.

The length of time that RAT/ALLOC 12 is stalled may depend on a number of factors and may be, for example, anywhere from a few to a few hundreds of clocks. For example, if the value stored in the memory location referred to by u-op (3) is also temporarily stored in data cache 7, then it will not take much time for u-op (3) to be executed. However, if a "cache miss" occurs and the value needs to be read from memory, the execution of u-op (3) may take a significant amount of time and the stall of RAT/ALLOC 12 will be correspondingly long.

There are many other examples where a stall may last a significant amount of time. For example, RAT/ALLOC 12 may be stalled while waiting for the retirement of particular u-ops in order to be able to rename the source of another u-op. If the particular u-ops appear in a sequence of u-ops after a conditional jump, they may be executed by OOO subsystem 14 before the condition has been evaluated. However, these particular u-ops will not be retired until the condition has been evaluated and it has been determined that these particular u-ops belong to the branch that is being selected by the conditional jump.

The sequence of u-ops (1)–(4) given above is just an example, and there are many other sequences of u-ops that may lead to a stall of the RAT/ALLOC 12, for example, any of the following sequences:

(1)(2)(4)
(1)(3)(4)

(1)(mov AX←BBCC)(4)
(1)(mov AX←BBCC)(2)(4)
(1)(mov AX←BBCC)(3)(4)
(1)(mov AX←BBCC)(2)(3)(4).

Moreover, any of these sequences of u-ops or the sequence of u-ops (1)–(4) may have unrelated u-ops interspersed therebetween.

In general, whenever a u-op writes to a partial register (e.g. AX, AL, AH, etc) and before the u-op has been retired a subsequent u-op then attempts to read the value of the full register (e.g. EAX), there may be a stall of the RAT/ALLOC 12. Similarly, whenever a u-op writes to a partial register (e.g. AL, AH, etc) and before the u-op has been retired a subsequent u-op then attempts to read the value of a bigger partial register (e.g. AX) of which the smaller partial register is a component, there may be a stall of the RAT/ALLOC 12. Moreover, a u-op that attempts to read the value of a full register or bigger partial register need not be a "read" u-op. If u-op (4) of the exemplary sequence above had been replaced by the u-op (4') add EAX←EAX, 22334455 (hex), the same stall problem of the RAT/ALLOC 12 would have occurred, since the "add" u-op involves reading the value of EAX. In more general terms, a potential stall may exist for any u-op having a full register or bigger partial register as its source, when previous u-ops write to partial registers comprised in the full register or bigger partial register.

RAT/ALLOC 12 may include a stall detection and u-ops injection unit 17 to determine when such a situation is about to occur, and to generate and insert one or more new u-ops into the u-op sequence as needed to prevent the stall.

For the exemplary sequence of u-ops given above, if a stall is detected, then stall detection and u-ops injection unit 17 may generate new u-ops (3.b) and (3.c) and may insert new u-ops (3.b) and (3.c) into the stream of u-ops as follows:

ORIGINAL FLOW:
(1.a) mov r1←11223344 (hex)
(2.a) mov r2[7..0]←CC (hex)
(3.a) mov r3[15..8]←memory location.
NEW MERGE U-OPS:
(3.b) merge r4←r1[31..8],r2[7..0]
(3.c) merge r5←r4[31..16,7..0],r3[15..8]
BACK TO ORIGINAL FLOW:
(4) read EAX
additional u-ops Stall detection and u-ops injection unit 17 generates new u-op (3.b) to merge the values of temporary registers r2 and r1. RAT/ALLOC 12 allocates a temporary register r4 to receive the merged values of temporary registers r2 and r1, so that the lowest 8 bits of temporary register r4 are identical to the lowest 8 bits of temporary register r2 and the highest 24 bits of temporary register r4 are identical to the highest 24 bits of temporary register r1.

Similarly, stall detection and u-ops injection unit 17 generates new u-op (3.c) to merge the values of temporary registers r4 and r3. RAT/ALLOC 12 allocates a temporary register r5 to receive the merged values of temporary registers r4 and r3, so that the second-lowest 8 bits of temporary register r5 are identical to the second-lowest 8 bits of temporary register r3 and the highest 16 bits and lowest 8 bits of temporary register r5 are identical to the highest 16 bits and lowest 8 bits of temporary register r4.

(If the format of u-ops were to enable three sources and one destination, then u-ops (3.b) and (3.c) could be replaced by a single u-op merging the values of temporary registers r1, r2 and r3 into temporary register r5 so that the lowest 8 bits of temporary register r5 are identical to the lowest 8 bits of temporary register r2, the second-lowest 8 bits of temporary register r5 are identical to the second-lowest 8 bits of temporary register r3, and the highest 16 bits of temporary register r5 are identical to the highest 16 bits of temporary register r1.)

The insertion of u-ops (3.b) and (3.c) into the sequence of u-ops enables RAT/ALLOC 12 to rename the source of u-op (4) to temporary register r5, resulting in the following sequence of u-ops:

ORIGINAL FLOW:
(1.a) mov r1←11223344 (hex)
(2.a) mov r2[7..0]←CC (hex)
(3.a) mov r3[15..8]←memory location
NEW MERGE U-OPS:
(3.b) merge r4←r1[31..8],r2[7..0]
(3.c) merge r5←r4[31..16,7..0],r3[15..8]
BACK TO ORIGINAL FLOW:
(4.a) read r5
additional u-ops The potential stall is eliminated because RAT/ALLOC 12 may rename the source of u-op (4) to temporary register r5 even before u-ops (1.a), (2.a) and (3.a) are executed, and certainly before all of u-ops (1.a), (2.a) and (3.a) have been retired. RAT/ALLOC 12 may handle (e.g. allocate/rename and output to OOO subsystem 14) the additional u-ops that follow u-op (4) in the sequence without any additional delay. Moreover, OOO subsystem 14 may execute these additional u-ops even though the execution of u-op (4.a) may be delayed internally while OOO subsystem 14 waits for the execution results of u-ops (1.a), (2.a) and (3.a).

Undefined values of bits in temporary registers r2, r3 and r4 are indicated in FIG. 1 with a question mark.

The u-ops output by instruction decoder 10 refer to architectural registers in RRF 16. Since RAT/ALLOC 12 renames sources and allocates temporary registers as destinations of u-ops before the u-ops are output to OOO subsystem 14 for execution, RAT/ALLOC 12 employs a register tracking mechanism 19 for keeping track of the relationship between the temporary registers and the architectural registers. For example, this mechanism may involve pointers for each architectural register that indicate which temporary registers are currently allocated as destinations of u-ops the real destinations of which are that architectural register or parts thereof. For a given architectural register, the pointers indicate where results of u-ops that are to be written to the architectural register upon retirement will be stored when the u-ops are executed.

Three exemplary pointer mechanisms and methods of pointer management are described hereinbelow with respect to FIGS. 2–6. However, alternative pointer mechanisms and methods of pointer management are equally applicable to embodiments of the invention. Moreover, alternative mechanisms for keeping track of the relationship between the temporary registers and the architectural registers may involve something other than pointers and such mechanisms are also equally applicable to embodiments of the invention.

Figure 2:
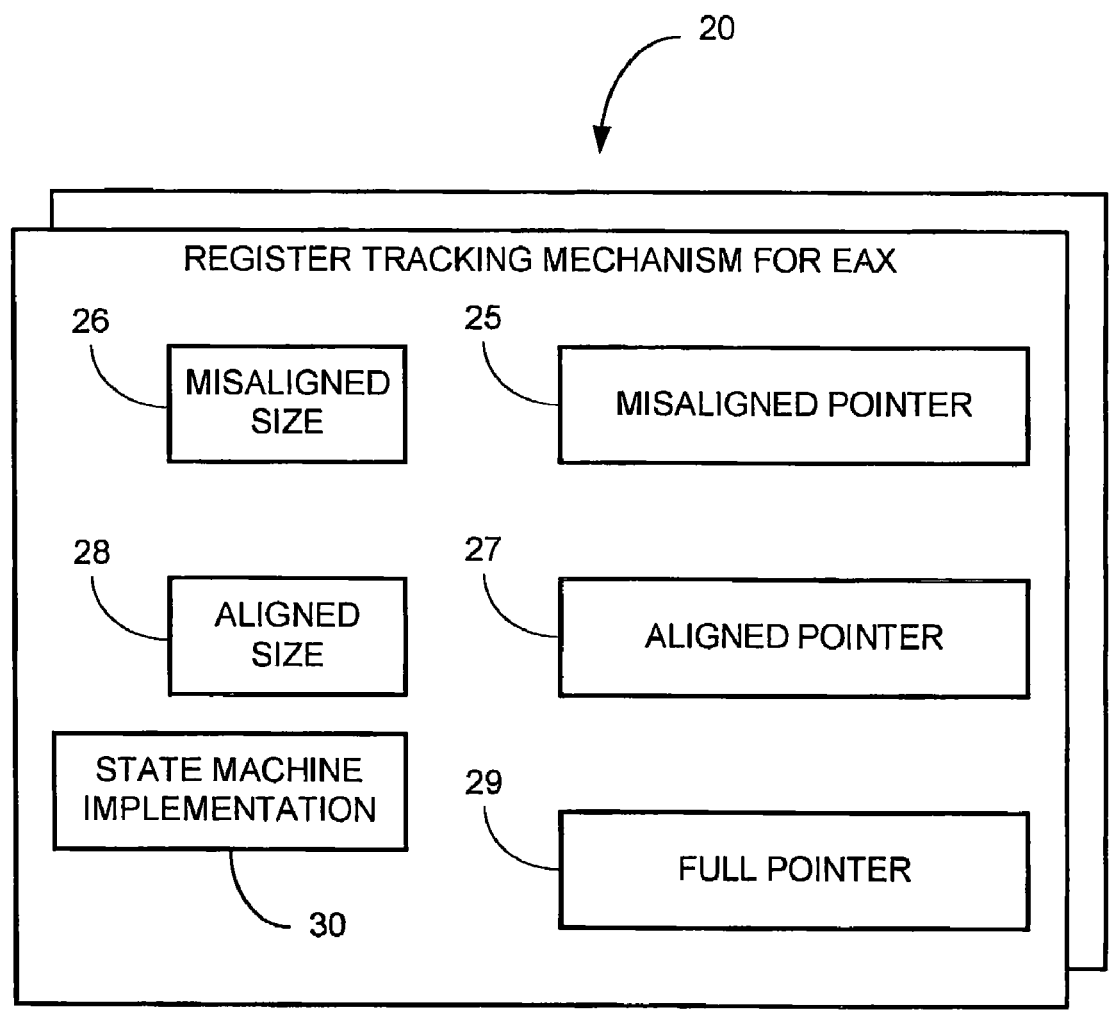
FIG. 2 is a block diagram of a register tracking mechanism according to one embodiment of the invention.

FIG. 2 is a block diagram of a register tracking mechanism according to one embodiment of the invention. Register tracking mechanism 20 may include pointers for each architectural register of RRF 16. For example, for architectural register EAX, register tracking mechanism 20 may include a state machine implementation 30 and three pointers: a pointer for a misaligned partial register ("misaligned pointer") 25, a pointer for an aligned partial or full register ("aligned pointer") 27, and a pointer for a full register ("full pointer") 29. Register tracking mechanism 20 may also include, for architectural register EAX, a misaligned size indication 26 for misaligned pointer 25 and an aligned size indication 28 for aligned pointer 27. The size indications, misaligned pointers, aligned pointers and optional full pointers for the various architectural registers may be organized in one or more arrays.

Figure 3:
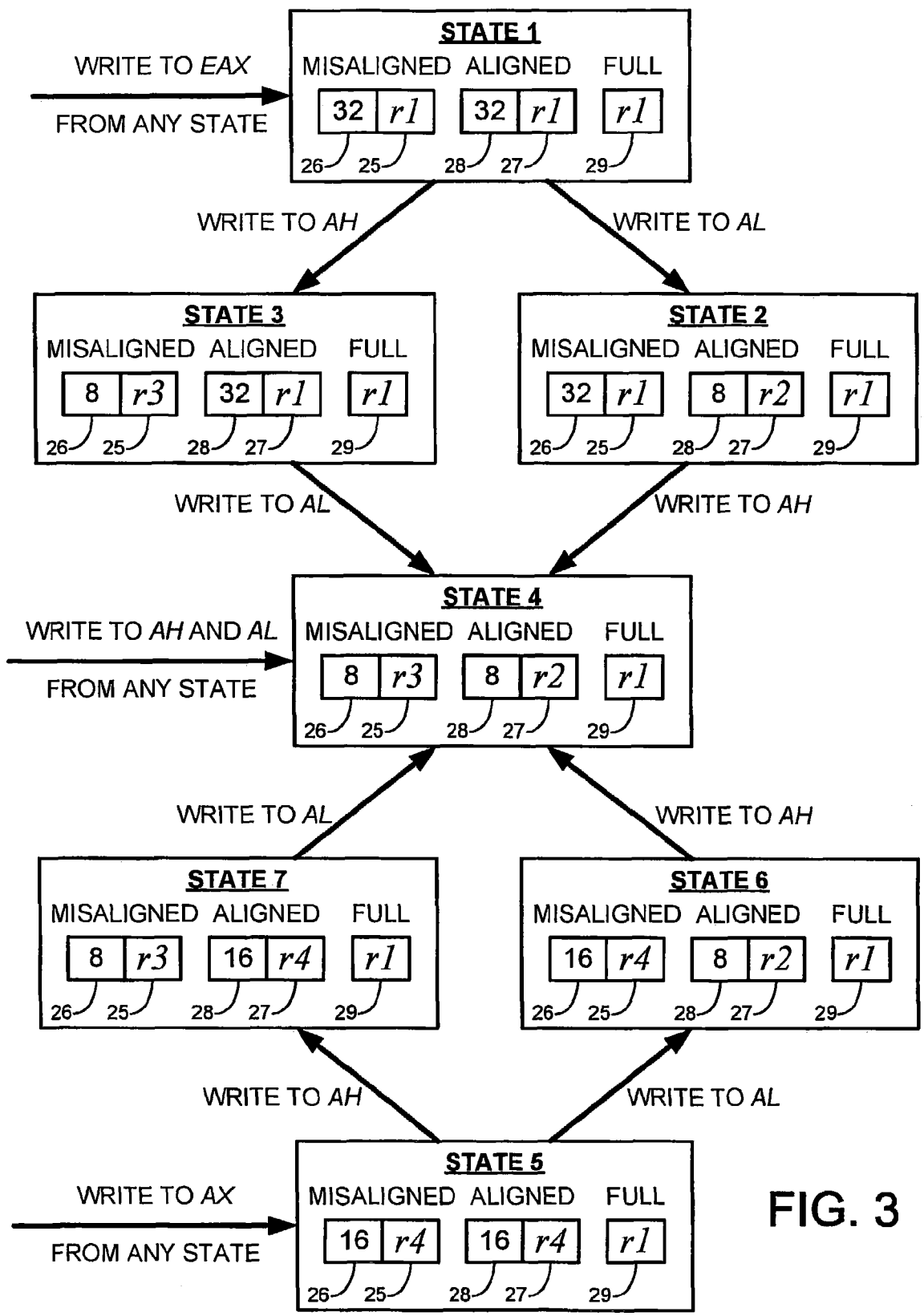
FIG. 3 is a state machine according to one embodiment of the invention.

The meaning of the pointers and size indications is best understood with respect to the state machine shown in FIG. 3. The state machine of FIG. 3 may be implemented in state machine implementation 30 using software, hardware, firmware or any combination thereof.

When RAT/ALLOC 12 allocates a temporary register to store a 32-bit result of a u-op that is ultimately to be written to architectural register EAX upon retirement of the u-op ("write to EAX"), then the state machine is in STATE 1, regardless of the previous state. If, for example, RAT/ALLOC 12 allocates temporary register r1 (as in the u-op (1.a) mov r1←11223344 (hex)), then misaligned size indication 26 is 32, misaligned pointer 25 points to temporary register r1, aligned size indication 28 is 32, aligned pointer 27 points to temporary register r1 and full pointer 29 points to temporary register r1. In this example, STATE 1 represents the information that the most updated values of all 32 bits of architectural register EAX are found in temporary register r1.

If from STATE 1 RAT/ALLOC 12 allocates a temporary register to store an 8-bit result of a u-op that is ultimately to be written to architectural partial register AL upon retirement of the u-op ("write to AL"), then the state machine is in STATE 2. If, for example, RAT/ALLOC 12 allocates temporary register r2 (as in the u-op (2.a) mov r2[7..0]←CC (hex)), then aligned size indication 28 is 8, aligned pointer 27 points to temporary register r2, and the other size indication and pointers remain unchanged from STATE 1. In this example, STATE 2 represents the information that the most updated values of the lowest 8 bits of architectural register EAX are found in temporary register r2, while the most updated values of the highest 24 bits of architectural register EAX are found in temporary register r1.

If from STATE 2 RAT/ALLOC 12 allocates a temporary register to store an 8-bit result of a u-op that is ultimately to be written to architectural partial register AH upon retirement of the u-op ("write to AH"), then the state machine is in STATE 4. If, for example, RAT/ALLOC 12 allocates temporary register r3 (as in the u-op (3.a) mov r3[15..8]← memory location), then misaligned size indication 26 is 8, misaligned pointer 25 points to temporary register r3, aligned size indication 28 is 8, aligned pointer 27 points to temporary register r2, and full pointer 29 points to temporary register r1. In this example, STATE 4 represents the information that the most updated values of the lowest 8 bits of architectural register EAX are found in temporary register r2, the most updated values of the second-lowest 8 bits of architectural register EAX are found in temporary register r3, and the most updated values of the highest 16 bits of architectural register EAX are found in temporary register r1.

If from STATE 1 RAT/ALLOC 12 allocates a temporary register to store an 8-bit result of a u-op that is ultimately to be written to architectural partial register AH when the u-op is retired ("write to AH"), then the state machine is in STATE 3. If, for example, RAT/ALLOC 12 allocates temporary register r3, then misaligned size indication 26 is 8, aligned pointer 25 points to temporary register r3, and the other size indication and pointers remain unchanged from STATE 1. In this example, STATE 3 represents the information that the most updated values of the second-lowest 8 bits of architectural register EAX are found in temporary register r3, while the most updated values of the lowest 8 bits and highest 16 bits of architectural register EAX are found in temporary register r1.

If from STATE 3 RAT/ALLOC 12 allocates a temporary register to store an 8-bit result of a u-op that is ultimately to be written to architectural partial register AL upon retirement of the u-op ("write to AL"), then the state machine is in STATE 4, which has been discussed hereinabove. STATE 4 may also be reached from any state by a substantially simultaneous write of an 8-bit value to architectural partial register AL and of an 8-bit value to architectural partial register AH. In this context, "substantially simultaneous" may mean that the "writes" occur in the same clock cycle.

When RAT/ALLOC 12 allocates a temporary register to store a 16-bit result of a u-op that is ultimately to be written to architectural register AX upon retirement of the u-op ("write to AX"), then the state machine is in STATE 5, regardless of the previous state. If, for example, RAT/ALLOC 12 allocates temporary register r4, then misaligned size indication 26 is 16, misaligned pointer 25 points to temporary register r4, aligned size indication 28 is 16, and aligned pointer 27 points to temporary register r4. Full pointer 29 is unchanged from its previous state, and points to temporary register r1. In this example, STATE 5 represents the information that the most updated values of the lowest 16 bits of architectural register EAX are found in temporary register r4, while the most updated values of the highest 16 bits of architectural register EAX are found in temporary register r1.

If from STATE 5 RAT/ALLOC 12 allocates a temporary register to store an 8-bit result of a u-op that is ultimately to be written to architectural partial register AL upon retirement of the u-op ("write to AL"), then the state machine is in STATE 6. If, for example, RAT/ALLOC 12 allocates temporary register r2, then aligned size indication 28 is 8, aligned pointer 27 points to temporary register r2, and the other size indication and pointers remain unchanged from STATE 5. In this example, STATE 6 represents the information that the most updated values of the lowest 8 bits of architectural register EAX are found in temporary register r2, the most updated values of the second-lowest 8 bits of architectural register EAX are found in temporary register r4, and the most updated values of the highest 16 bits of architectural register EAX are found in temporary register r1. STATE 4 may be reached from STATE 6 by writing an 8-bit value to architectural partial register AH.

If from STATE 5 RAT/ALLOC 12 allocates a temporary register to store an 8-bit result of a u-op that is ultimately to be written to architectural partial register AH upon retirement of the u-op ("write to AH"), then the state machine is in STATE 7. If, for example, RAT/ALLOC 12 allocates temporary register r3, then misaligned size indication 26 is 8, misaligned pointer 25 points to temporary register r3, and the other size indication and pointers remain unchanged from STATE 5. In this example, STATE 7 represents the information that the most updated values of the second-lowest 8 bits of architectural register EAX are found in temporary register r3, the most updated values of the lowest 8 bits of architectural register EAX are found in temporary register r4, and the most updated values of the highest 16 bits of architectural register EAX are found in temporary register r1. STATE 4 may be reached from STATE 7 by writing an 8-bit value to architectural partial register AL.

It should be noted that although it appears from the state machine of FIG. 3 that the value of full pointer 29 never changes, it does in fact receive a new value at STATE 1 upon the allocating of a temporary register to store a 32-bit result of a u-op that is ultimately to be written to architectural register EAX upon retirement of the u-op.

Stall detection and u-ops injection unit 17 may identify a potential stall when state machine implementation 30 is not in STATE 1 of the state machine of FIG. 3 and RAT/ALLOC 12 is now about to rename a u-op that reads the value of architectural register EAX. Similarly, stall detection and u-ops injection unit 17 may identify a potential stall when state machine implementation 30 is not in STATE 1 or STATE 5 of the state machine of FIG. 3 and RAT/ALLOC 12 is now about to rename a u-op that reads the value of architectural partial register AX.

However, register tracking mechanism 20 includes the information of where the most updated values of all 32 bits of the architectural register are located. Therefore, stall detection and u-ops injection unit 17 may determine which merge u-ops are to be generated and inserted into the sequence of u-ops in order to merge the updated bits in a single temporary register, thus eliminating the potential stall. For example, if RAT/ALLOC 12 is about to rename a u-op that reads architectural register EAX when state machine implementation 30 is in STATE 2 or STATE 3 or STATE 5, then stall detection and u-ops injection unit 17 will generate and insert only one merge u-op into the sequence. In another example, if RAT/ALLOC 12 is about to rename a u-op that reads architectural register EAX or architectural partial register AX when state machine implementation 30 is in STATE 4 or STATE 6 or STATE 7, then stall detection and u-ops injection unit 17 will generate and insert two merge u-ops into the sequence. In a further example, if RAT/ALLOC 12 is about to rename a u-op that reads architectural partial register AX when state machine implementation is in STATE 2 or STATE 3, then stall detection and u-ops injection unit 17 will generate and insert only one merge u-op into the sequence. If some of the u-ops in the sequence have been retired and therefore some of the most updated values are located in the architectural register, the appropriate pointer will point to the architectural register and one or more of the merge u-ops will have the architectural register as one of its sources.

Figure 4:
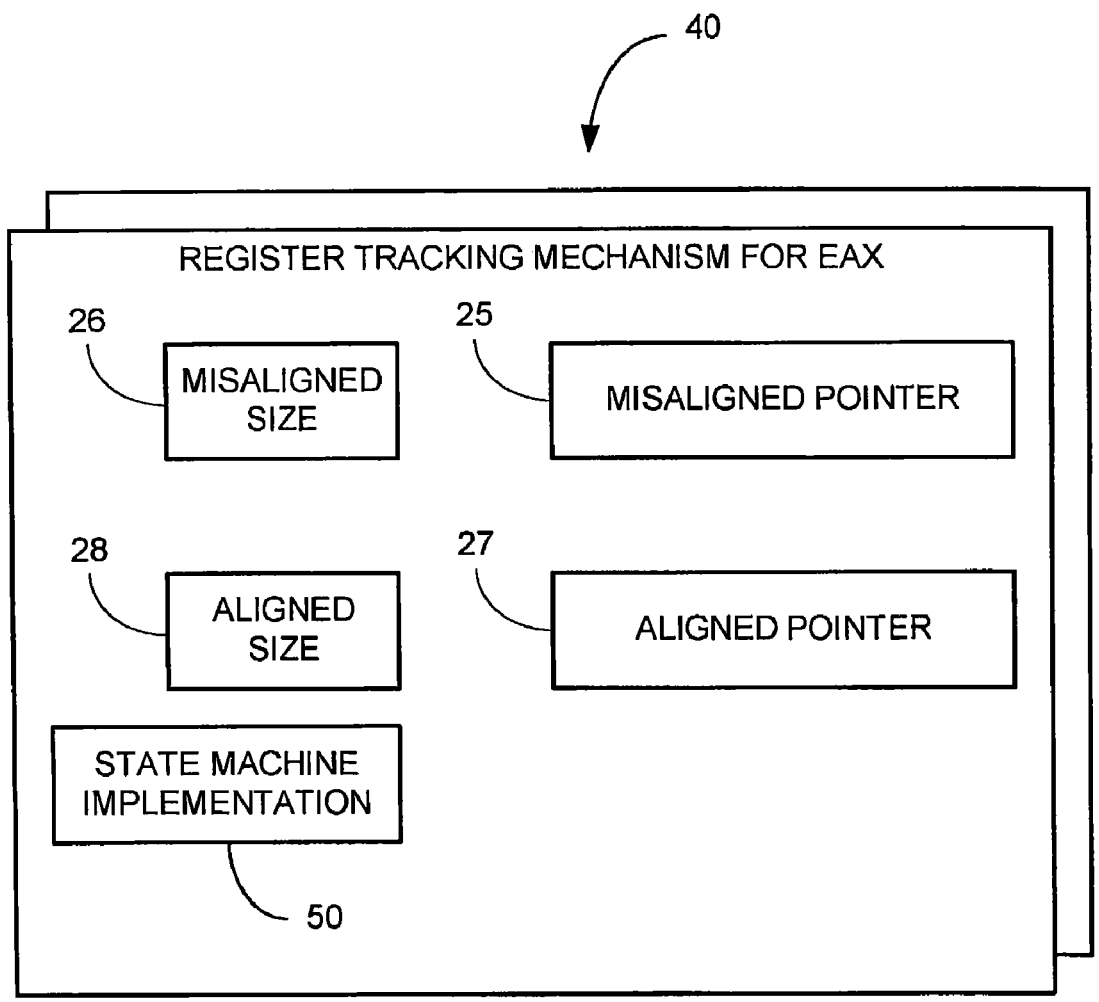
FIG. 4 is a block diagram of a register tracking mechanism according to another embodiment of the invention.

FIG. 4 is a block diagram of a register tracking mechanism according to another embodiment of the invention. Register tracking mechanism 40 may include pointers for each architectural register of RRF 16. For example, for architectural register EAX, register tracking mechanism 40 may include a state machine implementation 50 and two pointers: misaligned pointer 25 and aligned pointer 27. Register tracking mechanism 40 may also include, for architectural register EAX, misaligned size indication 26 for misaligned pointer 25 and aligned size indication 28 for aligned pointer 27. The size indications, misaligned pointers, and aligned pointers for the various architectural registers may be organized in one or more arrays.

Figure 5:
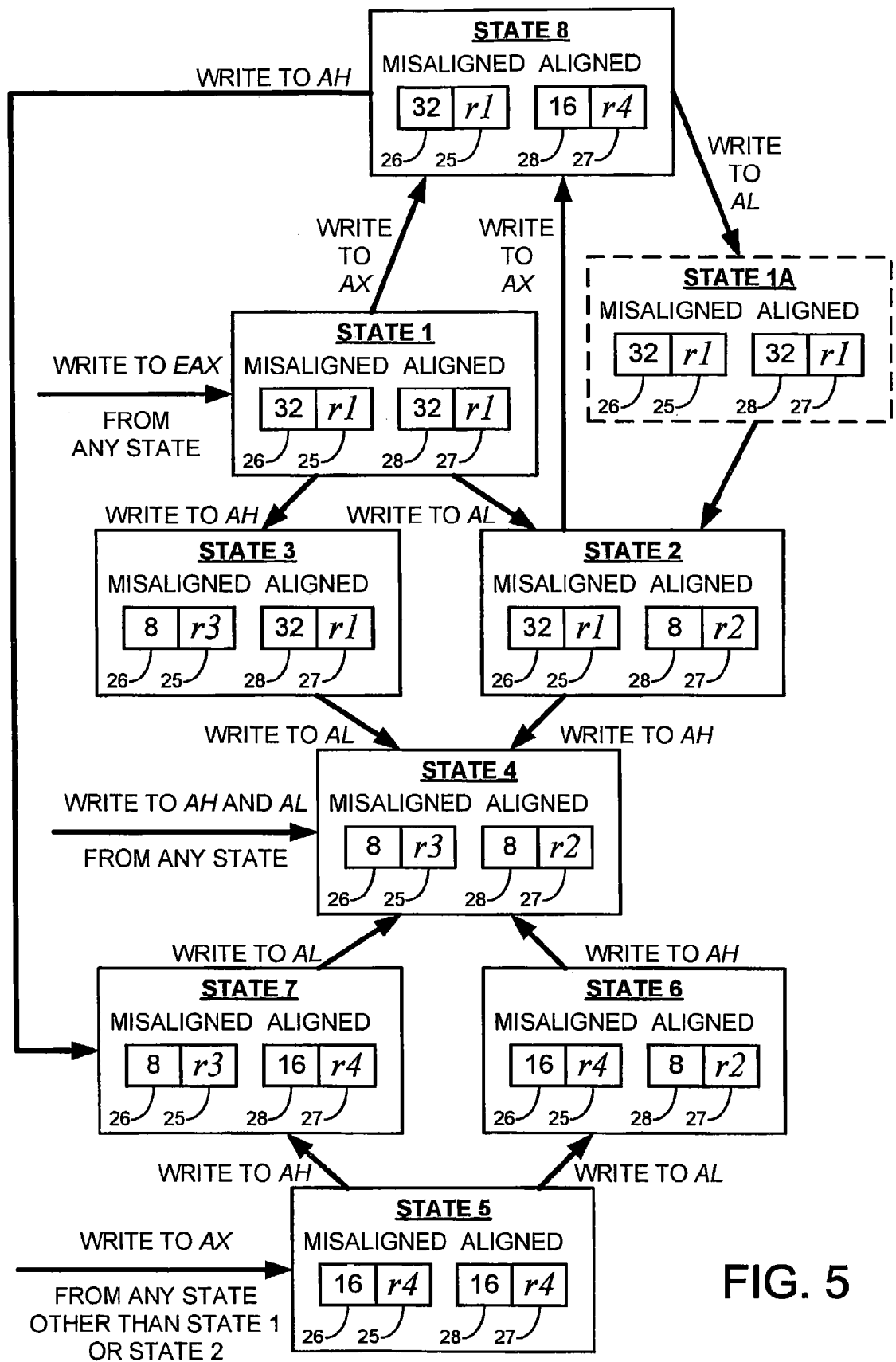
FIG. 5 is a state machine according to another embodiment of the invention.

The meaning of the pointers and size indications is best understood with respect to the state machine shown in FIG. 5. The state machine of FIG. 5 may be implemented in state machine implementation 50 using software, hardware, firmware or any combination thereof.

As will be explained in more detail hereinbelow, register tracking mechanism 40 enables the elimination of potential stalls for u-ops reading architectural partial register AX, but enables the elimination of potential stalls for u-ops reading architectural register EAX only in some situations.

When RAT/ALLOC 12 allocates a temporary register to store a 32-bit result of a u-op that is ultimately to be written to architectural register EAX upon retirement of the u-op ("write to EAX"), then the state machine is in STATE 1, regardless of the previous state. If, for example, RAT/ALLOC 12 allocates temporary register r1 (as in the u-op (1.a) mov r1←11223344 (hex)), then misaligned size indication 26 is 32, misaligned pointer 25 points to temporary register r1, aligned size indication 28 is 32, and aligned pointer 27 points to temporary register r1. In this example, STATE 1 represents the information that the most updated values of all 32 bits of architectural register EAX are found in temporary register r1.

If from STATE 1 RAT/ALLOC 12 allocates a temporary register to store an 8-bit result of a u-op that is ultimately to be written to architectural partial register AL upon retirement of the u-op ("write to AL"), then the state machine is in STATE 2. If, for example, RAT/ALLOC 12 allocates temporary register r2 (as in the u-op (2.a) mov r2[7..0]←CC (hex)), then aligned size indication 28 is 8, aligned pointer 27 points to temporary register r2, and the other size indication and pointer remain unchanged from STATE 1. In this example, STATE 2 represents the information that the most updated values of the lowest 8 bits of architectural register EAX are found in temporary register r2, while the most updated values of the highest 24 bits of architectural register EAX are found in temporary register r1.

If from STATE 2 RAT/ALLOC 12 allocates a temporary register to store an 8-bit result of a u-op that is ultimately to be written to architectural partial register AH upon retirement of the u-op ("write to AH"), then the state machine is in STATE 4. If, for example, RAT/ALLOC 12 allocates temporary register r3 (as in the u-op (3.a) mov r3[15..8]←memory location), then misaligned size indication 26 is 8, misaligned pointer 25 points to temporary register r3, aligned size indication 28 is 8, and aligned pointer 27 points to temporary register r2. In this example, STATE 4 represents the information that the most updated values of the lowest 8 bits of architectural register EAX are found in temporary register r2, and the most updated values of the second-lowest 8 bits of architectural register EAX are found in temporary register r3, while all information regarding the location of the most updated values of the highest 16 bits of architectural register EAX is lost.

If from STATE 1 RAT/ALLOC 12 allocates a temporary register to store an 8-bit result of a u-op that is ultimately to be written to architectural partial register AH when the u-op is retired ("write to AH"), then the state machine is in STATE 3. If, for example, RAT/ALLOC 12 allocates temporary register r3, then misaligned size indication 26 is 8, aligned pointer 25 points to temporary register r3, and the other size indication and pointer remain unchanged from STATE 1. In this example, STATE 3 represents the information that the most updated values of the second-lowest 8 bits of architectural register EAX are found in temporary register r3, while the most updated values of the lowest 8 bits and highest 16 bits of architectural register EAX are found in temporary register r1.

If from STATE 3 RAT/ALLOC 12 allocates a temporary register to store an 8-bit result of a u-op that is ultimately to be written to architectural partial register AL upon retirement of the u-op ("write to AL"), then the state machine is in STATE 4, which has been discussed hereinabove. STATE 4 may also be reached from any state by a substantially simultaneous write of an 8-bit value to architectural partial register AL and of an 8-bit value to architectural partial register AH. In this context, "substantially simultaneous" may mean that the "writes" occur in the same clock cycle.

When RAT/ALLOC 12 allocates a temporary register to store a 16-bit result of a u-op that is ultimately to be written to architectural register AX upon retirement of the u-op ("write to AX"), then the state machine is in STATE 5 (unless the previous state was one in which value of misaligned size indication 26 is 32—i.e. STATE 1 and STATE 2—in which case the state machine is in STATE 8, as will be discussed hereinbelow). If, for example, RAT/ALLOC 12 allocates temporary register r4, then misaligned size indication 26 is 16, misaligned pointer 25 points to temporary register r4, aligned size indication 28 is 16, and aligned pointer 27 points to temporary register r4. In this example, STATE 5 represents the information that the most updated values of the lowest 16 bits of architectural register EAX are found in temporary register r4, while all information regarding the location of the most updated values of the highest 16 bits of architectural register EAX is lost.

If from STATE 5 RAT/ALLOC 12 allocates a temporary register to store an 8-bit result of a u-op that is ultimately to be written to architectural partial register AL upon retirement of the u-op ("write to AL"), then the state machine is in STATE 6. If, for example, RAT/ALLOC 12 allocates temporary register r2, then aligned size indication 28 is 8, aligned pointer 27 points to temporary register r2, and the other size indication and pointer remain unchanged from STATE 5. In this example, STATE 6 represents the information that the most updated values of the lowest 8 bits of architectural register EAX are found in temporary register r2, and the most updated values of the second-lowest 8 bits of architectural register EAX are found in temporary register r4, while all information regarding the location of the most updated values of the highest 16 bits of architectural register EAX is lost. STATE 4 may be reached from STATE 6 by writing an 8-bit value to architectural partial register AH.

If from STATE 5 RAT/ALLOC 12 allocates a temporary register to store an 8-bit result of a u-op that is ultimately to be written to architectural partial register AH upon retirement of the u-op ("write to AH"), then the state machine is in STATE 7. If, for example, RAT/ALLOC 12 allocates temporary register r3, then misaligned size indication 26 is 8, misaligned pointer 25 points to temporary register r3, and the other size indication and pointer remain unchanged from STATE 5. In this example, STATE 7 represents the information that the most updated values of the second-lowest 8 bits of architectural register EAX are found in temporary register r3, the most updated values of the lowest 8 bits of architectural register EAX are found in temporary register r4, while all information regarding the location of the most updated values of the highest 16 bits of architectural register EAX is lost. STATE 4 may be reached from STATE 7 by writing an 8-bit value to the architectural partial register AL.

If from STATE 1 or STATE 2 RAT/ALLOC 12 allocates a temporary register to store a 16-bit result of a u-op that is ultimately to be written to architectural register AX upon retirement of the u-op ("write to AX"), then the state machine is in STATE 8. If, for example, RAT/ALLOC 12 allocates temporary register r4, then misaligned size indication 26 remains 32, misaligned pointer 25 continues to point to temporary register r1, aligned size indication 28 is 16, and aligned pointer 27 points to temporary register r4. In this example, STATE 8 represents the information that the most updated values of the lowest 16 bits of architectural register EAX are found in temporary register r4, while the highest 16 bits of architectural register EAX are found in temporary register r1. In STATE 8, the renaming of both architectural partial register AL and architectural partial register AH will come from aligned pointer 27. STATE 7 may be reached from STATE 8 by writing an 8-bit value to architectural partial register AH.

STATE 2 may be reached from STATE 8 by writing an 8-bit value to architectural partial register AL, although, in this example, this transition between states will require the second-lowest 8 bits of temporary register r4 to be merged into temporary register r1. This is represented by a temporary move from STATE 8 into a STATE 1A and then into STATE 2. In this example, at STATE 1A misaligned size indication 26 remains 32, misaligned pointer 25 continues to point to temporary register r1, aligned size indication 28 is 32 and aligned pointer 27 points to temporary register r1. Stall detection and u-ops injection unit 17 may identify when state machine implementation 50 is in STATE 8 and RAT/ALLOC 12 is now about to rename a u-op that writes to architectural partial register AL. In this case, stall detection and u-ops injection unit 17 may generate and insert a new merge u-op (for example, merge r1[31..8]←r1[31..16], r4[15..8]) into the sequence of u-ops before the u-op that writes to architectural partial register AL, to ensure that the most updated values of the second lowest 8 bits of architectural register EAX are not lost.

Stall detection and u-ops injection unit 17 may identify a potential stall when state machine implementation 50 is not in STATE 1, STATE 5 or STATE 8 of the state machine of FIG. 5 and RAT/ALLOC 12 is now about to rename a u-op that reads the value of architectural partial register AX. However, in each state of the state machine of FIG. 5, register tracking mechanism 40 includes the information of where the most updated values of the lowest 16 bits of the architectural register EAX are located. Therefore, stall detection and u-ops injection unit 17 may determine which merge u-op is to be generated and inserted into the sequence of u-ops in order to merge the updated lowest 16 bits into a single temporary register, thus eliminating the potential stall. If some of the u-ops in the sequence have been retired and therefore some of the most updated values are located in the architectural register, the appropriate pointer will point to the architectural register and the merge u-op will have the architectural register as one of its sources.

Stall detection and u-ops injection unit 17 may identify a potential stall when state machine implementation 50 is not in STATE 1 and RAT/ALLOC 12 is now about to rename a u-op that reads the value of architectural register EAX. If state machine implementation 50 is in STATE 2 or STATE 3 or STATE 8, then register tracking mechanism 40 includes enough information to enable stall detection and u-ops injection unit 17 to determine which merge u-op is to be generated and inserted into the sequence of u-ops in order to merge the most updated 32 bits into a single temporary register, thus eliminating the potential stall. If some of the u-ops in the sequence have been retired and therefore some of the most updated values are located in the architectural register, the appropriate pointer will point to the architectural register and the merge u-op will have the architectural register as one of its sources.

However, if state machine implementation 50 is in STATE 4, STATE 5, STATE 6, or STATE 7 and RAT/ALLOC 12 is now about to rename a u-op that reads the value of architectural register EAX, then register tracking mechanism 40 does not include enough information to merge the most updated 32 bits into a single temporary register. In such a situation, RAT/ALLOC 12 will be stalled-until the u-ops involving the partial registers have retired. However, if the statistics of u-op sequences typically processed by processor 4 are such that this situation does not occur very often, then the loss of performance due to these stalls may be tolerable.

Figure 6:
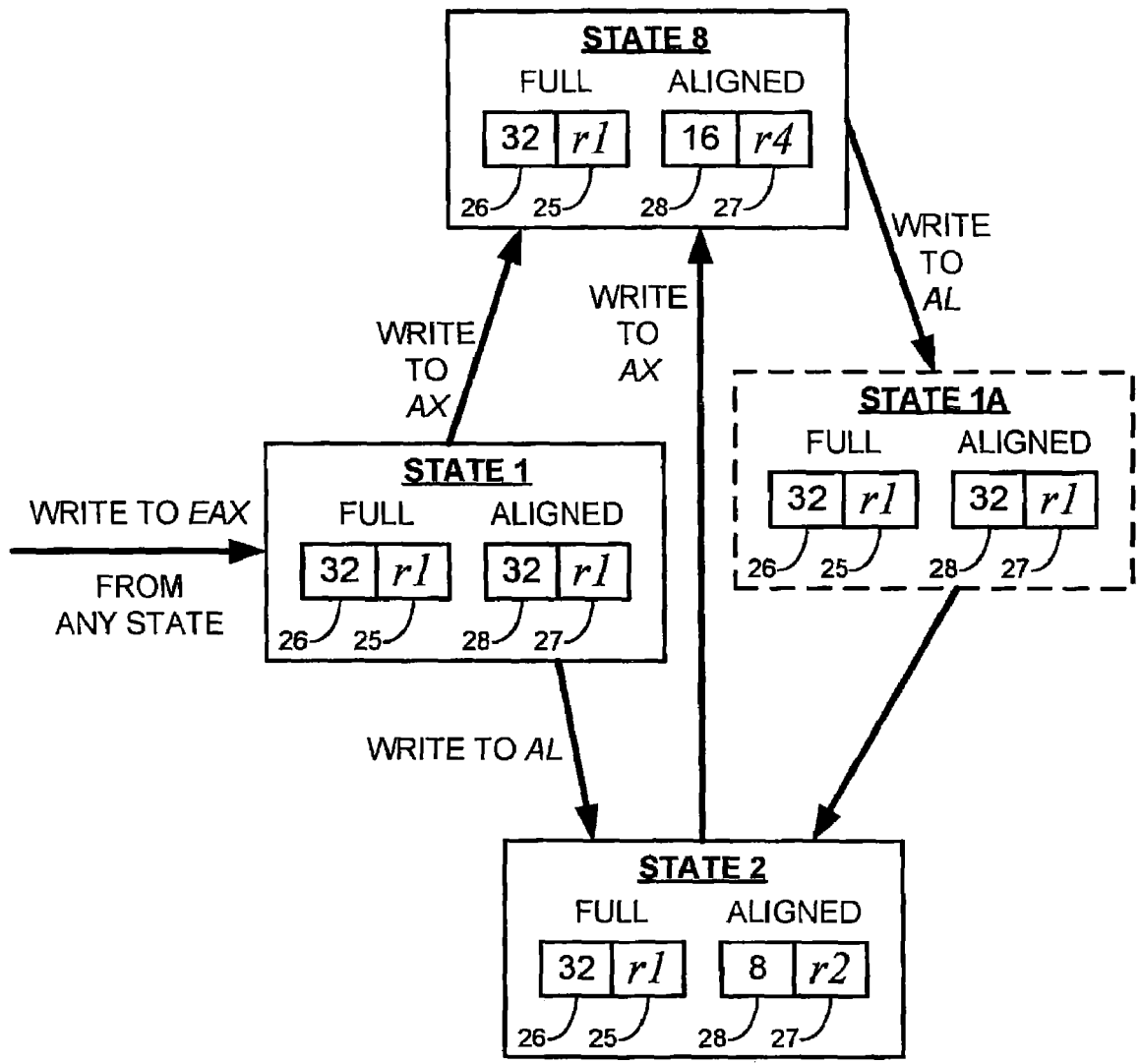
FIG. 6 is a state machine according to a further embodiment of the invention.

In another embodiment, the register tracking mechanism of FIG. 4 may be used where state machine implementation 50 implements the state machine of FIG. 6. Size indication 26 and pointer 25 refer to the full register, while size indication 28 and pointer 27 refer to the aligned register (AL/AX/EAX). The state machine of FIG. 6 may be implemented in state machine implementation 50 using software, hardware, firmware or any combination thereof.

This embodiment enables the elimination of potential stalls for u-ops reading architectural partial register AX and for u-ops reading architectural register EAX, in a processing environment where there is no direct access to architectural partial register AH, and therefore the sequence of u-ops output by instruction decoder 10 does not include direct references to architectural partial register AH. STATE 1, STATE 1A, STATE 2 and STATE 8 have been described hereinabove with respect to the state machine of FIG. 5 and that description is also applicable to the state machine of FIG. 6. It should be noted that for this embodiment, when stall detection and u-ops injection unit 17 detects a potential stall due to a write to AL/AX and a read of EAX or due to a write to AL and a read of AX, only one merge u-op will be generated and inserted into the sequence of u-ops.

While certain features of embodiments of the invention have been illustrated and described herein, many modifications, substitutions, changes, and equivalents will now occur to those of ordinary skill in the art. In a non-limiting example, instead of storing the mode of the instruction decoder in a register, a bit indicating the mode of the instruction decoder may be added to the macroinstruction before it is decoded. It is, therefore, to be understood that the appended claims are intended to cover all such modifications and changes as fall within the true spirit of the invention.

What is claimed is:

1. A method comprising:
enabling renaming of a source of a particular micro-operation even though two or more pointers—each currently indicating where values of a respective group of bits of said source will be found when said particular micro-operation is executed—do not all point to the same register,
wherein enabling renaming of said source comprises:
generating one or more micro-operations to merge said values into a single register; and
inserting said one or more micro-operations into a sequence of micro-operations that includes said particular micro-operation.

2. The method of claim 1, wherein generating said one or more micro-operations comprises generating two micro-operations when said two or more pointers are three pointers that currently point to three registers, respectively.

3. A method comprising:
enabling renaming of sources of micro-operations appearing later in a sequence of micro-operations than a particular micro-operation without having to wait for values of bits of a source of said particular micro-operation to be calculated, even though two or more pointers—each currently indicating where values of a respective group of bits of said source will be found when said particular micro-operation is executed—do not all point to the same register,
wherein enabling renaming of sources of said micro-operations appearing later in said sequence comprises renaming said source of said particular micro-operation, and
wherein renaming said source of said particular micro-operation comprises:
generating one or more new micro-operations to merge said values into a single register; and
inserting said one or more new micro-operations into said sequence.

4. A method comprising:
if two or more pointers—each currently indicating where values of a respective group of bits of said source will be found when a particular micro-operation is executed—do not all point to the same register, enabling execution of micro-operations appearing later than said particular micro-operation in a sequence of micro-operations without having to wait for said values to be calculated, if said micro-operations appearing later in said sequence are not dependent upon said source, not dependent upon said values, and not dependent upon a result of said particular micro-operation,
wherein enabling execution of said micro-operations appearing later in said sequence comprises renaming said source of said particular micro-operation, and
wherein renaming said source of said particular micro-operation comprises:
generating one or more new micro-operations to merge said values into a single register; and
inserting said one or more new micro-operations into said sequence.

5. A method comprising:
allocating a first register to store results of a first micro-operation a destination of which is an entire architectural register;
subsequently allocating a second register to store results of a second micro-operation a destination of which is a larger partial register of said architectural register; and
when a third register is about to be allocated to store results of a third micro-operation a destination of which is a smaller partial register contained in said larger partial register, generating a merge micro-operation to merge into a single register a) values stored in said first register that correspond to bits of said architectural register but not to bits of said larger partial register and b) values stored in said second register that correspond to bits of said larger partial register but not to bits of said smaller partial register, and inserting said merge micro-operation ahead of said third micro-operation into a sequence of micro-operations including at least said first micro-operation, said second micro-operation and said third micro-operation.

6. The method of claim 5, further comprising:
after inserting said merge micro-operation into said sequence, allocating said third register to store said results of said third micro-operation.

7. The method of claim 6, further comprising:
updating pointers to indicate that values that correspond to bits of said architectural register but not to bits of said smaller partial register will be stored in said single register when said merge micro-operation is executed and values that correspond to bits of said smaller partial register will be stored in said third register when said third micro-operation is executed.

8. A processor comprising:
an architectural register;
a register tracking mechanism to maintain pointers that indicate where results of micro-operations that are to be written to said architectural register upon retirement will be stored when said micro-operations are executed; and a stall detection and micro-operations injection unit a) to identify that said architectural register is a source of a particular micro-operation and that two or more pointers—each to indicate where values of a respective group of bits of said source will be found when said particular micro-operation is executed—do not point to the same register, b) to generate one or more new micro-operations to merge said values into a single register, and c) to insert said one or more new micro-operations into a sequence of micro-operations that includes said particular micro-operation, wherein said pointers include a pointer that indicates where results of a most recently allocated micro-operation that writes to all bits of said architectural register upon retirement are to be stored when said micro-operation is executed.

9. A processor comprising:

an architectural register;

a register tracking mechanism to maintain pointers that indicate where results of micro-operations that are to be written to said architectural register upon retirement will be stored when said micro-operations are executed; and a stall detection and micro-operations injection unit a) to identify that a partial register of said architectural register is a source of a particular micro-operation and that two or more pointers—each to indicate where values of a respective group of bits of said source will be found when said particular micro-operation is executed—do not point to the same register, b) to generate a new micro-operation to merge said values into a single register, and c) to insert said new micro-operation into a sequence of micro-operations that includes said particular micro-operation, wherein said pointers include a pointer that indicates where results of a most recently allocated micro-operation that writes to all bits of said architectural register upon retirement are to be stored when said micro-operation is executed.

10. An apparatus comprising:

a voltage monitor; and a processor including at least:

an architectural register;

a register tracking mechanism to maintain pointers that indicate where results of micro-operations, that are to be written to said architectural register upon retirement will be stored when said micro-operations are executed; and a stall detection and micro-operations injection unit a) to identify that said architectural register is a source of a particular micro-operation and that two or more pointers—each to indicate where values of a respective group of bits of said source will be found when said particular micro-operation is executed—do not point to the same register, b) to generate one or more new micro-operations to merge said values into a single register, and c) to insert said one or more new micro-operations into a sequence of micro-operations that includes said particular micro-operation, wherein said pointers include a pointer that indicates where results of a most recently allocated micro-operation that writes to all bits of said architectural register upon retirement will be stored when said micro-operation is executed.

11. An apparatus comprising:

a voltage monitor; and a processor including at least:

an architectural register;

a register tracking mechanism to maintain pointers that indicate where results of micro-operations, that are to be written to said architectural register upon retirement will be stored when said micro-operations are executed; and a stall detection and micro-operations injection unit a) to identify that a partial register of said architectural register is a source of a particular micro-operation having a source including a lower portion of bits of said architectural register and that two or more pointers—each to indicate where values of a respective group of bits of said source will be found when said particular micro-operation is executed—do not point to the same register, b) to generate a new micro-operation to merge said values into a single register, and c) to insert said new micro-operation into a sequence of micro-operations that includes said particular micro-operation, wherein said pointers include a pointer that indicates where results of a most recently allocated micro-operation that writes to all bits of said architectural register upon retirement will be stored when said micro-operation is executed.

12. A machine-readable medium having stored thereon instructions, which when executed by a machine, cause the machine to perform a method comprising:

enabling renaming of a source of a particular micro-operation even though two or more pointers—each currently indicating where values of a respective group of bits of said source will be found when said particular micro-operation is executed—do not all point to the same register, wherein enabling renaming of said source comprises;

generating and inserting into a sequence of micro-operations one or more new micro-operations that merge values distributed among more than one register into a single register.

13. The machine-readable medium of claim 12, wherein generating said one or more new micro-operations comprises generating two micro-operations when said values are distributed among three different registers.

14. A processor comprising:

an instruction decoder to decode a macroinstruction into one or more micro-operations; and means for enabling renaming of a source of a particular micro-operation even though two or more pointers—each currently indicating where values of a respective group of bits of said source will be found when said particular micro-operation is executed—do not all point to the same resister, wherein said means for enabling comprises:

means for generating one or more micro-operations to merge said values into a single register; and means for inserting said one or more micro-operations into a sequence of micro-operations that includes said particular micro-operation.

15. The processor of claim 14, wherein said means for generating comprises means for generating two micro-operations when said two or more pointers are there pointers that currently point to three registers, respectively.

* * * * *